Patented Mar. 25, 1930

1,751,612

UNITED STATES PATENT OFFICE

OSCAR L. BARNEBEY, OF DETROIT, MICHIGAN, AND MERRITT B. CHENEY, OF BRIGGS-DALE, OHIO; JOSEPHINE B. CHENEY, ADMINISTRATRIX OF SAID MERRITT B. CHENEY, DECEASED, ASSIGNOR TO SAID BARNEBEY

PROCESS FOR THE MANUFACTURE OF ABSORBENT CARBONACEOUS MATERIAL

No Drawing.   Application filed May 19, 1921.   Serial No. 470,939.

The invention relates to a treatment of carbonaceous material for the purpose of rendering said material highly adsorbent. The treatment consists in heating carbonaceous materials with reactive gases such as steam, carbon dioxide, combustion gases or other oxygen-containing gases hereinafter termed "oxygenated gases," or other gases having the capacity of reacting with the carbonaceous material.

The process is applicable to a wide variety of carbonaceous materials, indeed any material which contains carbon for its active constituent may be advantageously treated by this process to make such material highly adsorbent for specific uses in the arts. Among such materials may be enumerated the carbon obtained from charring the following: Coconut shells and shells from other vegetable nuts, bituminous coal and semi-coal deposits, pitch and tar residue from distillation, husks, leaves, grains and straw, vines or stalks from various plants, wood and other fibrous material, natural or artificial, oil shales and similar carbon-carrying mineral matter, bones, animal tissues, blood or other animal matter, in fact any material which will furnish carbon by charring may be treated by this process.

Except in those cases where the raw material has been carbonized by some natural action or condition, the treatment involves (a) the incomplete charring or carbonization of the material by heating in a retort or the like and (b) heating the carbonized material with oxygenated gases in a suitable furnace. In our copending application for Letters Patent Serial No. 283,639, filed March 19, 1919, upon which has been granted Letters Patent No. 1,541,099, we have set forth a method and apparatus for the treatment of carbon-containing material and the present invention can be considered an improvement upon the practice disclosed in the said application and Letters Patent.

Heretofore, adsorbent carbon has been produced from carbon which is formed by charring carbonaceous material to a sufficiently high temperature and for a sufficient length of time to leave substantially no volatile matter and to make a very dense and hard charcoal. In our application Serial No. 283,639, we have described the treatment of such a charcoal to make it highly adsorbent. However, in that application no particular method of charring the raw material was described. The reason for conducting the charring in the manner stated in the case of previous processes seems to have been the thought that all tarry matter must be removed as completely as possible during the charring period to prevent deposition of secondary carbon during the treatment with gases containing oxygen. In the case of treatment with oxygenated gases the high temperature was employed by other inventors in order to reduce the time of treatment.

Our present invention is based upon a distinctly different method and involves the use of relatively low temperatures both for charring or carbonizing the carbonaceous material and for treating the resulting charcoal. While other processes of treatment are not applicable to carbon containing a high percentage of residual tarry matter, in the case of our new process these tarry matter, whether heavy or highly volatile, give no serious difficulty. Indeed, in practising our invention, we can leave a high percentage of tarry matter in the charred material, the low temperature of charring permitting this and the method of treatment being such as to obviate any difficulties incident to presence of the residual tarry matter. In practice, the amount of tarry matter left in the carbonized material varies with the specific nature of the particular material under consideration.

We have found that with many materials an improved practice is made possible by leaving 10% to 60% by weight of tarry matter in the char at the end of the charring period, such per cent being based on the total elementary carbon content of the char. That is to say, the heating of the material is maintained at a sufficiently low temperature and for a length of time proportioned to yield a charred material containing 10% to 60% tarry matter. In some cases the lower limit may extend to 5% tarry matter and accomplish in some part the purposes of our invention, but below this percentage with average raw material, very little advantage is secured.

For example following our improved process a material is produced in the carbonizing period which represents a yield of 34% by weight based on weight of raw vegetable material. If this char is heated to constant weight at 900° C. out of the presence of air or any gas with which reaction could occur this char will lose weight becoming a yield of 22% based on the weight of original raw vegetable material. This loss is 12% volatile tarry matter which remains in the partially carbonized material following our improved process. This 12% difference represents approximately 32.5% of the content of the charred material and somewhat more than 32.5% by weight of tarry matter in the char. The actual amount of tarry matter is higher than 32.5% since part of the tarry matter is decomposed to elementary carbon in heating to 900° C.

A more accurate method of determining the percentage of tarry matter is to extract the finely pulverized char with the solvent pyridine which has the capacity of dissolving the tarry matter and not elementary carbon. The test extractions can be made in a reflux condenser using alundum thimbles. After extraction is complete as shown by no further darkening of color of the main body of the pyridine, the carbon is removed, steam distilled at 500° to 600° C. to remove the pyridine, dried at 110° C. and weighed, the calculated loss in weight representing the percentage extracted or, in other words, the percentage of tarry matter in the char. This method also shows the desired range of our invention to be that corresponding to leaving 10% to 60% by weight of tarry matter in the carbonized material in the carbonizing stage of our process. Of this range, 20% to 40% by weight is most preferable.

These percentages apply to vegetable material containing little or no mineral matter. If the mineral content is high less percentages of tarry matter are left in the char proportionate to the mineral content. Should the mineral content in the char be 30%, for example, the diluent effect of this mineral matter is considered and our range of tarry matter content then becomes 7% to 42% and of this range 11% to 28% is most preferable, all computations being made on the basis of the vegetable matter content of the original material being carbonized.

After being thus incompletely charred the carbonized material is then ready for the second step comprising treatment with oxygenated gases at temperatures between 500° and 900° C. By oxygenated gases we mean gases such as carbon dioxide ($CO_2$), steam or other gases containing oxygen in combination and capable of similarly reacting with carbonaceous material.

In carrying out our process, we take coconut shells or other carbonaceous materials such as have been referred to above, place them in a retort and treat them at a gradually increasing temperature, finally finishing the treatment at a uniform predetermined temperature ranging from 350° C. to 700° C. and preferably not exceeding 500° C. During this treatment, distillation gases are rapidly removed. This rapid removal of the vapors can be effected by any suitable suction device, but we prefer to create such suction by leading the vapors into the combustion chamber of the retort where they are utilized as fuel. This slow, low temperature carbonization produces a charcoal containing a residue of more or less tarry matter, the amount of the latter depending upon the character of the material, the time of the treatment and the specific temperature employed.

To treat the carbon thus produced, we place it in a suitable furnace and gradually heat it in the presence of oxygenated gases such as steam, or carbon dioxide, or both, to a temperature ranging between 500° C. and 900° C. which is then uniformly maintained until the treatment is completed, this continued heating being in the presence of heated oxygenated gases. If the charcoal to be treated is coarse, it is crushed and sized before placing it in the furnace where it is preferably arranged in layers, from one-half to two inches thick in most cases. The layers may be thicker than this, up to four inches or more if the material is coarse and open textured. On the other hand, if the material is exceedingly finely divided, it may be desirable that the layers be less than one-half inch thick; the finer the material to be treated, the thinner should be the layers.

As stated above, the treating temperature should range between 500° C. and 900° C., the specific temperature used being dependent upon the character of the material. For most materials, the preferred temperature range is from 750° C. to 900° C. Above this range, the reaction becomes too violent and causes undue loss of the adsorbent product, and below this range, the reaction usually becomes too slow for practical operation. However, with some materials, the range may be extended as low as 500° C.

The time required for producing highly adsorbent carbon depends largely upon the character of the carbonized material being treated. Should the material be very dense and of coarse granulation, a much more prolonged time treatment is required than if the material is relatively loose and porous and of comparatively small cross section. With very dense charcoal a time treatment of twenty-four to forty-eight hours may be required to produce the best practical adsorbent carbon, whereas with very light charcoal the most practical time treatment may become one hour or even less.

During the oxygenated gas treatment, the residual tarry matter in the charcoal is gradually removed. This is facilitated by disposing the charcoal material in layers, thus giving uniform heat application and large surface exposure to reacting gases as well as allowing the gaseous products of reaction to be readily removed during the treatment with oxygenated gases. After the oxygenating treatment the materials are cooled and removed from the furnace.

The product resulting from our improved treatment is distinctly superior in several respects to carbon produced by prior processes known to us. In particular, our highly adsorbent products are characterized by the unshrunken condition of the particles. The importance of this resides not merely in a minimum final volume loss of the material incident to the treatment, but also in the fact that the freedom from shrinkage makes possible a more highly adsorbent material. Material which is treated at high temperatures or with substantially complete removal of tarry matter, in accordance with previous methods of charring, tends to sinter and shrink, thus causing partial or complete closing of the cellular wall structures. This shrinkage or contraction tends to tightly enclose any tarry matter which is formed at the higher temperatures, making it non-accessible for reaction with the oxygenated gases, thus making its removal very difficult. In addition, this contraction of the particles makes the removal of the original tarry matter itself more difficult and thus the material is less capable of being finally highly adsorbent.

By our slow and relatively low temperature treatment during charring, the pores or interstices of the material are left open and free for surface exposure during the treatment with oxygenated gases and, consequently, the tarry matter produced is much more readily removed in the treatment than tarry matter formed by charring at highly elevated temperatures.

The final product of our process is marked by a high degree of microscopic porosity and correspondingly high adsorbent properties. The reason for this will be understood when it is known that the residual tarry matter left in the charcoal after the charring stage of our process thoroughly permeates the body of the particles of the char. The distribution of the residual tarry matter is in accordance with the structure of that material. The subsequent removal of such residual tarry matter by our oxygenated gas process yields products of larger surface areas than heretofore obtained, on account of the fact that higher temperature charring shrinks the material. The superior adsorbent qualities of our carbon are further explained by the fact that it is necessary for the steam, carbon dioxide, or other reacting gases to penetrate into and for the gaseous products of reaction to escape from the small openings in the particles of carbon undergoing treatment. The rapid treatment characterizing the previously used processes, does not allow sufficient time for such gas penetration and escape, and on account of the excessive temperatures of the previously used methods, the material burns away on the exterior of the particles instead of enlarging its pores or openings toward the center of the particles. By following our practice of prolonged time and low temperature treatment, the action of the oxygenated gases proceeds far into the interior of the particles even to their centers and at the same time the original size of the particles is substantially maintained because the moderate temperatures do not cause shrinkage. The avoidance of shrinkage and the penetration of the reactive gases to the centers of the particles yield the maximum amount of exposed surface structure, and, inasmuch as adsorption is a surface phenomenon, the product secured by our process must have extremely high adsorptive qualities due to its immense surface areas.

By prolonging the time of reaction and lowering the temperature, in our treatment, not only is there a much less volume loss of the material, but the actual loss by weight is much less for any given quality of adsorbent or finished product than when high temperatures are used in short time treatments.

In order that our improved process may be quite clearly understood, its specific application in particular cases is shown by the following examples:

*Example 1.*—Coarsely crushed coconut shells are retorted at a temperature gradually increasing, over a period of about 30 minutes, to 500° C., after which they are cooled, removed from the retort and crushed and sized to the desired mesh, for example, 8 to 14 to the inch. The carbon thus produced is then placed, preferably in layer form, in a furnace, such for example as that described in our Letters Patent No. 1,541,099 above referred to, and heated to a temperature of 825° C., and the heat treatment, at the stated temperature and in the presence of similarly heated carbon dioxide and steam, is then prolonged for 20 hours. After the completion of this treatment, the activated carbon is cooled in the same gases and discharged from the furnace. The carbon is very highly activated and is excellent material for gas separation and recovery purposes.

*Example 2.*—Rice hull carbon can be produced by carbonizing rice hulls, husks or straw in a retort at a temperature gradually increasing for 15 minutes to 400° C. This material is then charged from the retort into a furnace and heated to 600° C. in the presence of furnace combustion gases at the same temperature for one hour, after which the material is cooled without access of air and discharged from the furnace. After furnacing, the carbonaceous material is treated with caustic soda solution to extract the silica. The sodium silicate is filtered out and the residue thoroughly washed to remove any excess of sodium hydroxide and soluble silicate. Carbon produced in this manner possesses high adsorptive qualities and is an excellent material for decolorizing solutions.

While we have set forth the procedure preferred in carrying out our invention and have given specific examples thereof, it is to be understood that the invention is not limited to the particular procedure or specific examples given except as may be indicated in the appended claims.

What we claim is:

1. The improvement in the art of producing adsorbent carbon consisting in treating carbonaceous material containing between 10% and 60% of its carbon content by weight of tarry matter with an oxygenated gas at reacting temperatures below 900° C.

2. The improvement in the art of producing adsorbent carbon consisting in treating charred bits or pieces of carbonaceous material containing between 10% and 60% by weight of its carbon content of tarry matter with an oxygenated gas at temperatures between 500° and 900° C. for a time sufficient to carbonize or remove substantially all the tarry matter.

3. The improvement in the art of producing adsorbent carbon consisting in treating charred bits or pieces of carbonaceous material containing between 10% and 60% by weight of its carbon content of tarry matter with an oxygenated gas at temperatures between 500° and 900° C. for a time sufficient to carbonize or remove substantially all the tarry matter and some of the carbon of the material.

4. The improvement in the art of producing adsorbent carbon consisting in treating layers of bits of carbonaceous material containing between 10% and 60% by weight of its carbon content of tarry matter with an oxygenated gas at temperatures between 500° and 900° C. for a time sufficient to carbonize or remove substantially all the tarry matter along with some carbon.

5. The improvement in the art of producing adsorbent carbon consisting in treating layers of bits or pieces of carbonaceous material, said layers being from one-half inch to four inches thick and said material containing between 10% and 60% by weight of its carbon content of tarry matter, with an oxygenated gas at temperatures between 500° and 900° C. for a time sufficient to carbonize or remove substantially all the tarry matter along with some carbon.

6. A process of producing adsorbent carbon comprising charring carbonaceous material between 350° and 500° C. until it contains at least 40% elementary carbon by weight, then treating such carbon with an oxygenated gas at temperatures between 500° and 900° C. for a time sufficient to carbonize or remove substantially all the tarry matter along with some carbon.

7. A process of producing adsorbent carbon comprising charring carbonaceous material between 350° and 500° C. until it contains not more than 90% elementary carbon by weight, then treating such carbon with an oxygenated gas at temperatures between 500° and 900° C. for a time sufficient to carbonize or remove substantially all the tarry matter along with some carbon.

8. A process of producing adsorbent carbon comprising charring carbonaceous material between 350° and 500° C. until it contains between 40% and 90% elementary carbon by weight, then treating such carbon with an oxygenated gas at temperatures between 500° and 900° C. for a time sufficient to carbonize or remove substantially all the tarry matter along with some carbon.

9. A process of producing adsorbent carbon comprising charring carbonaceous material between 350° and 500° C. until it contains between 40% and 90% elementary carbon by weight, removing the distillate as rapidly as formed, then treating such carbon with an oxygenated gas at temperatures between 500° and 900° C. for a time sufficient to carbonize or remove substantially all the tarry matter along with some carbon.

10. A process of producing adsorbent carbon comprising charring carbonaceous material at temperatures between 350° and 700° C., leaving 10% to 60% by weight of tarry matter in the carbonized material thus produced, and removing said tarry matter along with some carbon by action of an oxygenated gas at temperatures below 900° C.

11. A process of producing adsorbent carbon comprising charring carbonaceous material at temperatures between 350° and 700° C., leaving 10% to 60% by weight of tarry matter in the carbonized material, and removing said tarry matter by action of an oxygenated gas at temperatures below 900° C.

12. The process of producing adsorbent carbon, and the like, comprising charring carbonaceous material at temperatures between 350° and 700° C., leaving 10% to 60% by weight of tarry matter in the charred material thus produced, and then removing such tarry matter by treatment with an oxygenated gas.

13. The process of producing adsorbent carbon and the like, comprising charring carbonaceous material at temperatures between 350° and 700° C., leaving 10% to 60% by weight of tarry matter in the charred material, and removing such tarry matter along with some carbon by treatment with an oxygenated gas.

14. A process of manufacturing adsorbent material comprising incompletely charring carbonaceous material at temperatures between 350°–500° C., meanwhile removing the distillate as rapidly as formed, and subsequently treating the charred material at reacting temperatures below 900° C. with an oxygenated gas.

15. A process of manufacturing adsorbent material comprising incompletely charring carbonaceous material at temperatures between 350°–500° C., meanwhile removing the distillate as rapidly as formed, and subsequently treating the charred material at temperatures between 700°–900° C. with an oxygenated gas.

16. A process of manufacturing adsorbent material comprising incompletely charring carbonaceous material at temperatures between 350°–500° C., meanwhile removing the distillate as rapidly as formed, and subsequently treating the charred material at temperatures between 500°–900° C. with an oxygenated gas.

17. A process of producing adsorbent carbon, and the like, comprising charring carbonaceous material to produce a preliminary product containing from 10% to 60% by weight of tarry matter and removing such tarry matter along with some carbon by treatment with an oxygenated gas.

18. A process of producing adsorbent carbon, and the like, comprising charring carbonaceous material to produce a preliminary product containing from 10% to 60% by weight of tarry matter and removing such tarry matter along with some carbon by treatment with an oxygenated gas at temperatures below 900° C.

19. A process of producing adsorbent carbon, and the like, comprising charring carbonaceous material to produce a preliminary product containing 20 to 40% by weight of tarry matter, and removing such tarry matter along with some carbon by treatment with an oxygenated gas.

20. A process of producing adsorbent carbon, and the like, comprising charring carbonaceous material to produce a preliminary product containing 20 to 40% by weight of tarry matter, and removing such tarry matter along with some carbon by treatment with an oxygenated gas at temperatures below 900° C.

In testimony whereof, we hereunto affix our signatures.

OSCAR L. BARNEBEY.
MERRITT B. CHENEY.